3,093,629
WATER INSOLUBLE CYANOETHYLATED HYDROXYETHYL CELLULOSE OF HIGH NITROGEN CONTENT Wesley O. Fugate, Old Greenwich, and Ellsworth C. McClenachan, Stamford, Conn., assignors to American Cyanamid Company, New York, N.Y., a corporation of Maine
No Drawing. Filed Aug. 11, 1961, Ser. No. 130,768
4 Claims. (Cl. 260—231)

The present invention is concerned with a novel composition of matter. More particularly, it deals with cyanoethylated hydroxyethyl cellulose useful in dielectric applications and as thickening or dispersing agents.

Cellulose, both natural and regenerated, has been reacted with acrylonitrile in various ways to produce cyanoethylated derivatives. The physical properties of the resultant products vary somewhat with the nature of the cellulose, its molecular weight, the method of treatment and the like. However, they are determined most noticeably by the level of cyanoethylation.

This latter usually is defined either by nitrogen analysis, expressed in weight percent, or by a decimal fraction representing the number of cyanoethyl groups introduced per anhydroglucose unit. This decimal fraction usually is referred to as the "degree of substitution." For purposes of simplification, in this discussion the latter will be abbreviated as $DS_c$. Both terminologies are used in this specification. Complete cyanoethylation corresponds to a nitrogen content of about 13.1 percent nitrogen and a $DS_c$ of three.

At low degrees of substitution, i.e., a $DS_c$ up to about two, cyanoethylation of cellulose does not greatly alter its physical appearance, the fibrous characteristics being largely retained. However, as the $DS_c$ becomes higher, the characteristics of the product begin to change. As the $DS_c$ increases above about two, the loss of fibrous characteristics and the resemblance of the product to a thermoplastic material becomes increasingly noticeable. Moreover, the product begins to become soluble in certain organic solvents.

These characteristics begin to dominate in products having a $DS_c$ above about 2.0 (corresponding approximately to a nitrogen content of about 10.5% up to something over 13%). It is with highly-cyanoethylated type products, that the present invention is particularly concerned. Highly cyanoethylated cellulose (referred to hereinafter by the abbreviation "HCC"), particularly those having a $DS_c$ above about 2.3, have very desirable electrical characteristics for a number of purposes. Among these are a high dielectric constant and a relatively low dissipation factor.

This combination of properties has led to consideration of the application of HCC films in the fabrication of electroluminescent devices. In essence, such a device is comprised of two electrodes, at least one of which transmits light, between which a matrix having a phosphor dispersed therein, is interposed. A requirement for the matrix is that it have a high dielectric constant [S. Roberts J. Opt. Soc. Am. 42, 850 (1952)]. Among the dielectric matrices for electroluminescent phosphors that have been suggested are the ethers of cellulose, for example in U.S. Patents 2,774,004, 2,792,447, 2,918,594 and 2,901,652. The latter in particular suggests cyanoethylated cellulose as a preferred material of high dielectric constant.

To be wholly satisfactory for such purposes the matrix must have a dielectric constant of at least about nine, preferably higher. To attain this value in HCC ordinarily requires a $DS_c$ of about 2.0 or higher, corresponding to a nitrogen content of at least about 10.5 percent. It is also clear that the dissipation factor should be as low as possible since it represents the degree to which electrical energy is converted into unwanted heat. The dissipation factor should be below about 0.1 and preferably below about 0.04. This, in turn, requires that the HCC must be free of ionic impurities to a high degree. The concentration of such impurities should be less than about 200 parts per million and preferably not more than about 50 p.p.m. In addition, such products should be substantially water-white.

Unfortunately, the proposed use of HCC of a grade which exhibits the combination of desired electrical properties and lack of color in electroluminescent devices has been hampered by several problems. Probably the most serious are the inadequacy of the HCC solutions to easily disperse the phosphor and the poor degree of adhesion of such HCC to the conductive coating on the electrode (such an electrode typically being glass or some equivalent transparent or translucent non-conductor having a conductive coating consisting of a tin oxide film as shown in U.S. Patent 2,838,715 for example). In order to get good electrical contact, the minimum adhesion of the phosphor-containing matrix to the conductive coating on the glass must be sufficient to insure that the matrix film will not spontaneously peel from the conductive surface during the drying of the film which follows its casting from solution, or spraying onto the electrode. While the desired quality grade of HCC exhibits adequate adhesion to the glass or its equivalent, it frequently gives unsatisfactory results when films are cast on the layer of tin oxide or its equivalent which comprises the electrode surface on the so-called "conductive glass."

Furthermore, the film obtained using a suitable grade of HCC often has less strength than is desirable. While the weakness of the film is not as serious of drawback as its poor adhesion, it can be said that any improvement here, especially if not at the expense of the electrical properties, will also be desirable, particularly so in flexible electroluminescent panels such as shown in U.S. Patent 2,774,004. Improved strength also is very important in capacitor applications where cyanoethylated cellulose finds utility by virtue of its high dielectric constant. Very thin films (less than 1 mil) are employed in capacitors and they must have adequate strength to survive handling during manufacture. Previous attempts to make capacitors of specific types have been less than successful due to difficulties along these lines.

It is, therefore, a principal object of the present invention to develop a composition suitable for use for such dielectric purposes as the preparation of phosphor-bearing matrices, and the like, without being subject to the noted physical difficulties of inadequacy to disperse the phosphor, poor adhesion and relatively low strength. This has been accomplished in a relatively simple, but surprisingly successful, manner.

In general, the desired result is preferably accomplished by the provision of the cyanoethylated product of hydroxyethyl cellulose (hereinafter termed "CHC"). Surprisingly, it has been found that in contrast to HCC, CHC gives a tough clear film which withstands repeated bending, and even creasing. At the same time the film is stretchable (with some recovery) and when cast from an acetone solution is high adhesive to conductive glass. When phosphors are added to such solutions, the CHC aids markedly in uniformly dispersing the solid. This is especially useful since roller milling or similar dispersing methods may adversely affect the phosphor.

CHC is prepared by the cyanoethylation of hydroxyethyl cellulose with acrylonitrile using conventionally available hydroxyethylated cellulosic materials. The cyanoethyation procedure is along lines conventional in the cyanoethylation of cellulose per se.

Hydroxyethyl cellulose (hereinafter termed "HEC")

for the preparation of the compositions of the present invention is a known material which may be obtained from any suitable source.

The commercially available materials are generally prepared by the reaction of ethylene oxide with sodium cellulose. In this matter, hydroxyethyl, as well as hydroxyl terminated polyethoxy groups, are substituted onto the cellulosic backbone. The molar substitution, i.e., the number of moles of ethylene oxide per anhydroglucose unit, herein termed "MS," and the degree of polymerization (i.e., "DP") of the cellulose determines the properties of the HEC. In general, those HEC materials having an MS of between about 0.25 and 4.2 and preferably between about 1.0 and 1.75 and a DP of about 100 to about 2500 and preferably about 500 to 2000 have been found to have desirable characteristics. The DP and MS can vary independently over a wide range. However, those HEC materials having DP and MS values such that the viscosity of a 2% aqueous solution thereof at 20° C. is between five and about 500 centipoises and preferably between about 50 and 125 centipoises are the most practical. They present the least number of mechanical handling problems during the cyanoethylation process.

Any of a number of forms of cellulose is suitable for the preparation of the HEC. It may be a natural cellulose fiber or one of the available forms of regenerated cellulose. Several forms of both are commercially available, as for example cotton linters, viscose rayon and the like. Within reasonable limits any of such available products may be used. Wherever it is available, regenerated cellulose is perhaps preferable because it can be obtained in fibers of uniform size. This simplifies some of the mechanical handling problems.

Cyanoethylation procedures are not new per se with the present invention. They have heretofore been practiced with cellulose per se. Any one of the same procedures may be used to prepare CHC. One method is shown, for example in U.S. Patent 2,332,049. In general, such procedures involve reacting HEC with acrylonitrile in the presence of alkali, then precipitating and washing or otherwise isolating the cyanoethylated product. The degree of substitution, i.e., $DS_c$, of the resulting CHC may vary within certain limits depending on the purpose for which the product will be employed.

For use as a dielectric, the CHC should have a $DS_c$ of at least about 2.0 and preferably at least about 2.3. Those products having a $DS_c$ of between about 2.7 and 3.0 are especially preferred. For other uses the $DS_c$ can vary between about one and three.

The invention will be more fully disclosed in conjunction with the following illustrative examples. The latter show the method of operation as well as the products. Therein, unless otherwise noted, all parts and percentages are by weight and all temperatures are expressed in degrees centigrade.

*Example 1*

In a 2-liter flask equipped with an air-stirrer, reflux condenser, thermometer and pressure equalized dropping funnel were placed 1200 grams of acrylonitrile, 47 grams of distilled water in which 3 grams of NaOH had been dissolved and 60 g. of HEC (having an MS of 1.33 and whose 2% aqueous solution at 20° C. has a viscosity of 275±50 cent.). The mixture became very viscose and remained at 45° C. for 2 hours. The temperature began to drop at this point and was raised to 60° C. for 2 additional hours. 12.5 g. of AN and 12.5 g. acetic acid were thereupon added to stop the reaction. The thick solution was suction filtered through a sintered glass funnel, then precipitated into boiling water, washed throughly with distilled water and dried. The somewhat gummy product was then dissolved in acetone and twice reprecipitated into methanol. Finally vacuum drying gave a clear, tough, hard solid having a nitrogen content of 11.3%. Analysis showed an electrolyte content of less than 9 p.p.m.

The product cast from acetone onto lead foil or glass gave a clear adhesive film which could be bent or creased without breaking. It had a slight stretchability with little recovery and gave a pencil scratch of 5H. The softening range was about 100° C. Except for acetone, no solvent could be found to totally dissolve the polymer although DMF and $CH_3CN$ caused slight swelling.

*Example 2*

Repeating the procedure of Example 1, except for the use of an HEC having the same MS, but a 2% aqueous solution of which had a viscosity of 95±20 cent. at 20° C., a product is obtained which is similar in characteristics to that of Example 1.

*Example 3*

Repeating the procedure of Example 1, except for the use of an HEC having an MS of 1.33 and a viscosity in 2% aqueous solution at 20° C. of 10±2 cent., there is obtained a product which is more elastic than that of Example 1.

We claim:

1. Water insoluble cyanoethylated hydroxyethyl cellulose having a degree of polymerization between 100 and 2500, a hydroxyethyl molar substitution of between about 0.25 and about 4.2 and a degree of cyanoethylation above about 2.0.

2. The product of claim 1 wherein the hydroxyethyl molar substitution is between about 1.0 and 1.75.

3. The product of claim 1 wherein the degree of cyanoethylation is above about 2.3.

4. Water insoluble cyanoethylated hydroxyethyl cellulose wherein the degree of polymerization is between 100 and 2500, the hydroxyethyl molar substitution is between about 1.0 and 1.75 and the degree of cyanoethylation is above about 2.3.

References Cited in the file of this patent

UNITED STATES PATENTS

| 2,015,104 | Dreyfuss | Sept. 24, 1935 |
| 2,332,049 | Bock et al. | Oct. 19, 1943 |
| 2,375,847 | Houtz | May 15, 1945 |

FOREIGN PATENTS

| 592,352 | Great Britain | Sept. 16, 1947 |
| 636,295 | Great Britain | Apr. 26, 1950 |